Feb. 20, 1945.    L. D. SCHOOLFIELD ET AL    2,369,804
EDUCATIONAL DEVICE
Filed Nov. 15, 1943    3 Sheets-Sheet 1
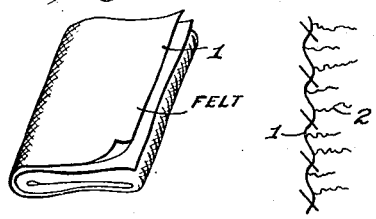
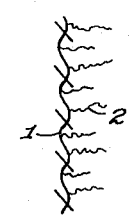
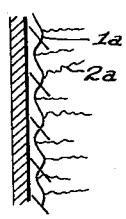
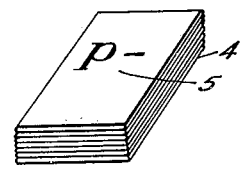
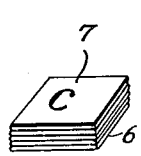
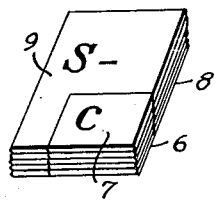
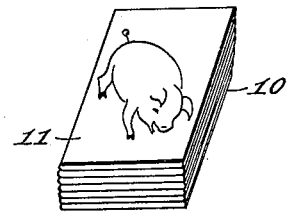
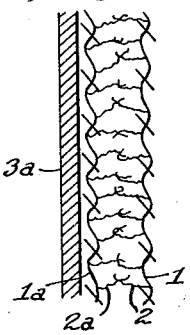
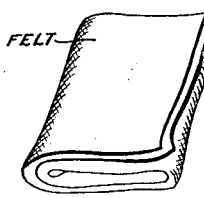
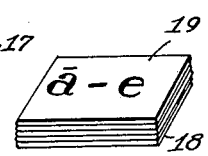
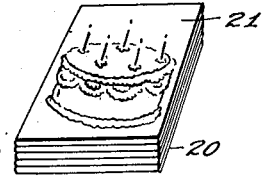
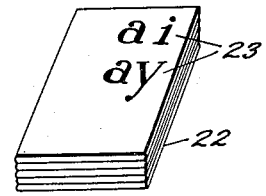
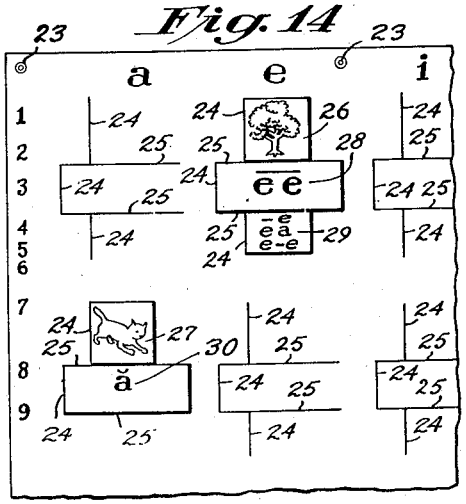
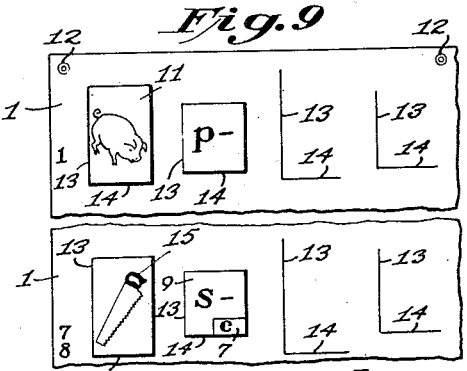
Inventors
Lucille D. Schoolfield
Josephine B. Timberlake

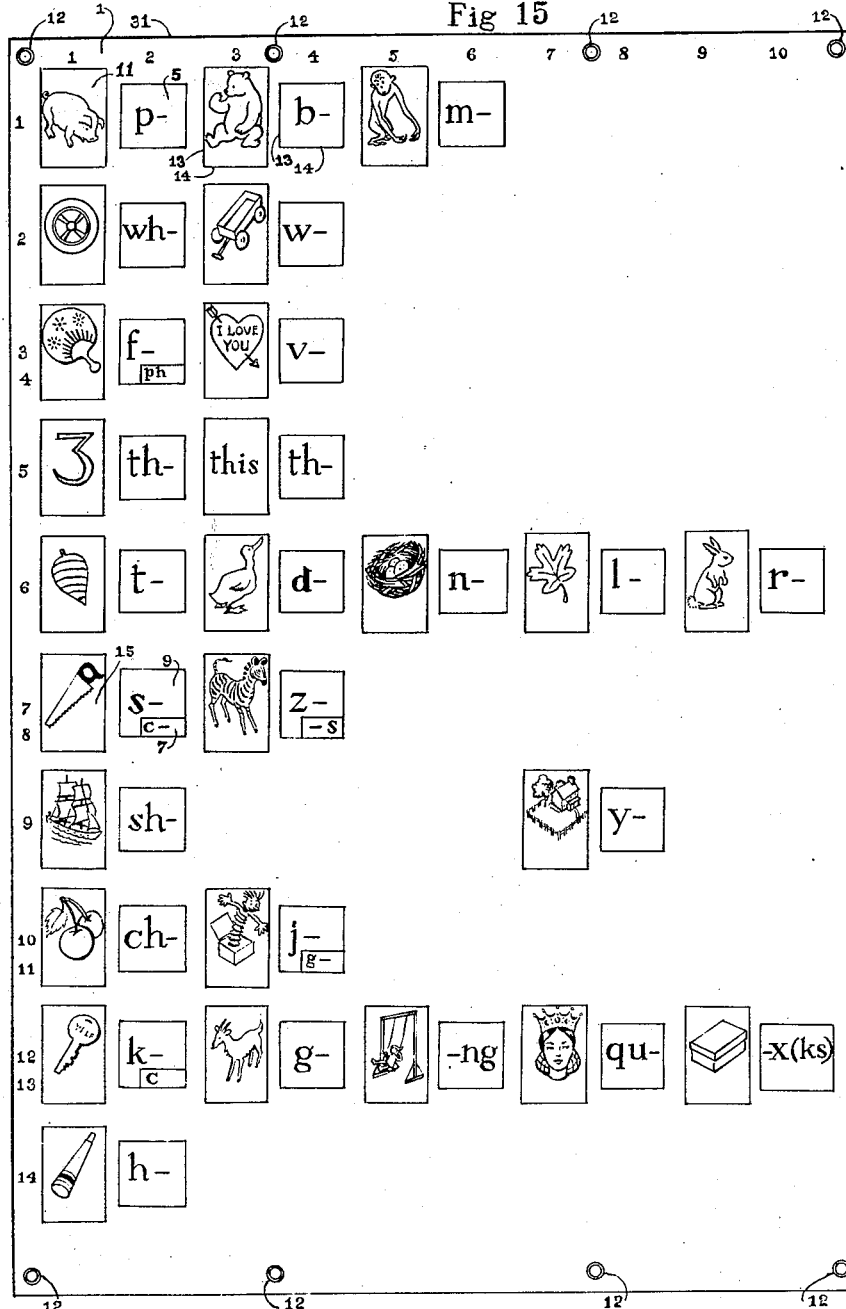
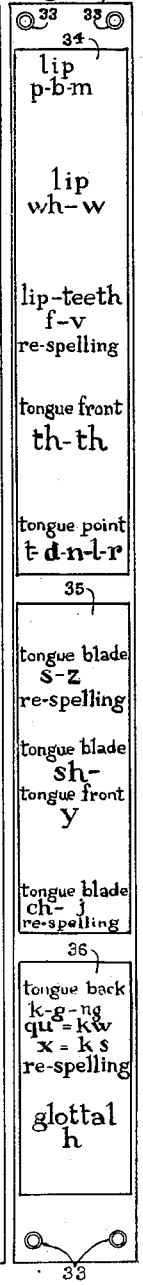

Feb. 20, 1945. L. D. SCHOOLFIELD ET AL 2,369,804
EDUCATIONAL DEVICE
Filed Nov. 15, 1943 3 Sheets-Sheet 3
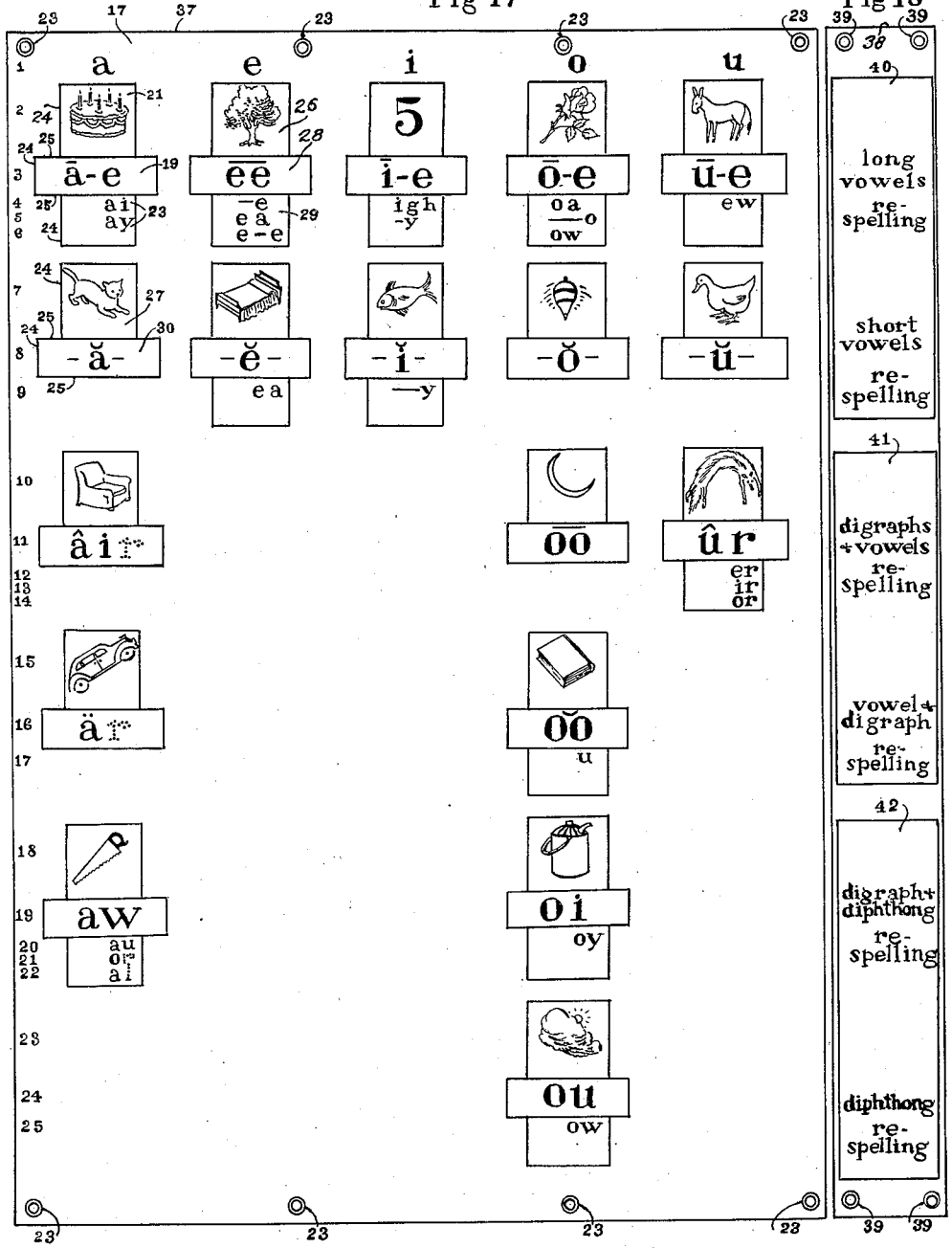

Patented Feb. 20, 1945

2,369,804

UNITED STATES PATENT OFFICE 2,369,804

EDUCATIONAL DEVICE

Lucille D. Schoolfield and Josephine B. Timberlake, Washington, D. C.

Application November 15, 1943, Serial No. 510,392

7 Claims. (Cl. 35—35)

The invention relates to a device for teaching spelling, reading, and for correcting articulatory defects of pronunciation, such as lisping, sound substitution ("tat" for cat, "dood" for good), baby talk, slovenly speech, etc., and more particularly, to train pupils in auditory discrimination of the phonetic elements of speech, thereby enabling them to understand and master unfamiliar words.

The invention consists in providing one or more charts comprising a series of cards on which are printed letters of the Roman alphabet; combinations of letters such as digraphs, diphthongs, and diacritical marks, emphasizing certain vocal sounds. Also included are cards bearing pictorial illustrations of objects in the names of which occur sounds emphasizing sounds corresponding to sounds of letters, combinations of letters, digraphs, etc., referred to in this paragraph. It also includes means for removably mounting the cards on suitable portable means of support.

Objects of the invention are achieved by means of devices described in the accompanying drawings and specification in which like letters and numerals refer to the same or similar parts throughout the several views.

The discussion of sounds in the description following has been based on Webster's Collegiate Dictionary, 3rd edition, page xv.

Fig. 1 is a view, in perspective, of a piece of flannel shown folded.

Fig. 2 is a vertical section of like flannel, from one side of which fibres protrude.

Fig. 3 is a vertical section of a piece of material, preferably cardboard, on one side of which is fastened a piece of flannel.

Fig. 4 represents a group of 26 cards imprinted with symbols emphasizing consonant sounds.

Fig. 5 represents a group of 5 substantially smaller cards, imprinted with alternative symbols, for use in re-spelling sounds of some symbols referred to in Fig. 4.

Fig. 6 represents a group of 5 cards, contained in Fig. 4, cut away for matching cards in Fig. 5, into the group represented by Fig. 6.

Fig. 7 is a view, in perspective, representative of a group of 26 cards, bearing pictorial illustrations emphasizing certain consonant sounds corresponding to sounds of symbols referred to in the paragraph relating to Fig. 4.

Fig. 8 shows a vertical section of a card, similar to the card referred to in Fig. 3, in contact with, and supported by a piece of flannel, Fig. 2, by reason of entangled fibres.

Fig. 9 is a plan view of a section of flannel, Fig. 1, unfolded, upon which various flannel-backed cards are removably supported by interlocked fibres.

Fig. 10 shows a chart of indicia-bearing flannel, folded.

Fig. 11 represents a group of 18 cards imprinted with symbols emphasizing vowel sounds.

Fig. 12 represents a group of 18 cards bearing pictorial illustrations emphasizing vowel sounds corresponding to those referred to in the preceding paragraph.

Fig. 13 represents a group of 12 cards imprinted with vowel symbols, used as alternatives in re-spelling sounds of symbols referred to in paragraphs relating to Figs. 11 and 12.

Fig. 14 is a plan view of a section of flannel, Fig. 10, unfolded, upon which various cards are removably supported.

Fig. 15 is a plan view of a piece of flannel, Fig. 1, unfolded, upon which various cards emphasizing consonant sounds are removably supported by interlocked fibres.

Fig. 16 represents an auxiliary chart bearing indicia relating to places of formation of sounds in the mouth.

Fig. 17 is a plan view of a piece of flannel, Fig. 14, unfolded, upon which various cards emphasizing vowel sounds are removably supported by interlocked fibres.

Fig. 18 represents an auxiliary chart bearing indicia relating to vowel characteristics and alternative symbols for respelling certain vowel sounds.

The piece of flannel 1, Fig. 1, one side of which is relatively smooth, the other having protruding fibres, is shown folded for convenience in handling and storing. Although we prefer to use flannel, wool felt or some other substance having curly, projecting fibres might be substituted. Hereinafter all fibrous material will be referred to as "flannel."

Protruding fibres are designated as 2 in Figs. 2 and 8.

In Fig. 3, a piece of material 3, preferably cardboard, is shown. Suitably fastened to the material is a piece of flannel 1a, similar to flannel 1, Fig. 1, having protruding fibres 2a. For the purpose of brevity, all cards should hereinafter be considered as flannel-backed with protruding fibres.

Each card of the group of 26 cards, Fig. 4, should be deemed to be imprinted with a consonant symbol 5.

Fig. 5 represents a group of substantially smaller cards 6, imprinted with a consonant or digraph 7, representing alternative symbols for use in respelling sounds of some symbols referred to in Fig. 4.

The term "respelling" should be construed as the use of alternative symbols representing the same sound when words are spelled. For example, "k" is sometimes pronounced like "c" as in cat; "ee" is pronounced like "ea" as in sea, etc.

Fig. 6 shows a group of five cards 8 contained in group 4, Fig. 4, cut away for matching group 6, Fig. 5 into group 8, Fig. 6. Each card in group 8 bears a consonant symbol, such as 9.

Each card of the group of twenty-six cards 10, Fig. 7, bears a pictorial illustration in the name of which the sound of a consonant symbol in group 4, Fig. 4, is emphasized.

It will be observed that the twenty-six cards 4, in Fig. 4, which includes 5 cards 8, in Fig. 6, plus 5 small cards 6, in Fig. 7, comprise all cards bearing consonant symbols. All cards bearing consonant symbols should be considered as constituting one major group, and all cards bearing vowel sounds as a second major group. Subdivisions of both major groups should be considered as minor groups.

The cards 3a Fig. 8, which may be assumed to be one of groups 4, Fig. 4; 6, Fig. 5; 8, Fig. 6, or 10, Fig. 7, bears upon one side a consonant symbol such as 5, Fig. 4; 7, Fig. 5; 9, Fig. 6, or a pictorial illustration, 11, Fig. 7, in the name of which is emphasized the sound of a consonant, corresponding to the sound of a consonant symbol on a card in one group of groups 4, 6, 8, and 10, and upon the opposite side a piece of flannel 1a, having protruding fibres 2a, in contact with another piece of flannel 1, Fig. 1, having protruding fibres 2, Fig. 2. It should be noted that when pieces of flannel 1 and 1a are pressed together fibres 2 and 2a will interlock causing card 3 to be removably supported by flannel 1, even though the latter is suspended in a vertical or semi-vertical position.

Fig. 9 shows a plan view of sections of flannel 1, Fig. 1, unfolded. Eyelets 12 are fastened in the flannel to provide means for suspending the chart from nails, tacks, hooks, etc.

Vertical lines 13 and horizontal lines 14 are marked or printed on the side of flannel, having protruding fibres, for guiding teacher and pupil in correct alignment of pictorial illustrations 11 and 15 and symbols 5, 7 and 9 when consonant sounds are taught.

Each card of a group of eighteen cards, 18, Fig. 11, is imprinted with one or more symbols 19, emphasizing vowel sounds.

Likewise, in Fig. 12, each card of a group of eighteen cards, 20, bears a pictorial illustration 21 emphasizing vowel sounds corresponding to sounds of symbols referred to in the preceding paragraph.

Twelve cards, 22, Fig. 13, each of which is imprinted with one or more vowel symbols 23, are used as alternatives for respelling certain sounds referred to in paragraphs relating to Figs. 11 and 12.

In Fig. 14 a plan view of a section of flannel 17, Fig. 10, is shown unfolded. Eyelets 23 are provided for suspending the flannel from suitable means of support. Vertical lines 24 and horizontal lines 25 are marked or printed on the side of the flannel having protruding fibres for guiding teacher and pupil in aligning pictorial illustrations and symbols when vowel sounds are taught.

Fig. 15 shows a plan view of flannel 1, Fig. 1 unfolded, upon which various flannel-backed cards are removably supported by interlocked fibres, as partly shown in Figs. 8 and 9. It should be noted that the whole comprises a chart 31, for teaching consonant sounds. Symbols used in the chart are arranged in a definite pattern for a specific purpose. They are grouped in relation to the parts and positions of the organs of speech that give them their individual characteristics.

The auxiliary chart 32, Fig. 16, comprises a strip of flannel, having inserted eyelets 33, upon which are suitably mounted three sections of cardboard. The number of sections is arbitrary. They depend upon the length of the flannel. In this case, three sections are shown for convenience in folding the chart.

Each section bears certain inscriptions. For example, the upper section 34, is inscribed "lip, p b m" etc.; the middle section 35, "tongue blade s z" etc., and the lower section 36, tongue back "k n g" etc. The important factor is to align the inscriptions on the cards with corresponding symbols on chart 31. Chart 31 may be used without chart 32. However, when used, chart 32 helps to define the pattern of chart 31 for the pupil.

When symbols in chart 31 are read from left to right, as in line 1, it will be seen that they register with consonant sounds, p b m, chart 32, formed by the lips. Consonant symbols w and wh, line 2, also register with sounds formed by the lips. In line 3, f and v register with sounds formed by the lower lip and teeth. In line 4 "ph" is a respelling of f etc. When symbols are read by columns it will be observed that they are grouped according to specific sounds. In column 2 are listed all of the "voiceless" or "breath" consonants as they appear at the beginning of words. Names of illustrations in column 1 emphasize the sounds of corresponding symbols in column 2. In column 4 are listed "voiced" equivalents of "voiceless" consonants in column 2. Names of illustrations in column 3 emphasize sounds of "voiced" consonants in column 4. In column 6 are listed all "nasal" consonants. Names of illustrations in column 5 emphasize corresponding sounds of nasal consonants m and n at the beginnings of words, and ng at the ending of words, as in column 6. In column 8 are listed additional voiced consonants as they appear at the beginnings of words. Names of illustrations in column 7 emphasize sounds of corresponding symbols in column 8. In column 10 are listed one voiced consonant "r" as it appears at the beginning of a word, and one voiceless consonant "x" as it appears at the ending of a word. Names of illustrations in column 9 emphasize sounds of corresponding symbols in column 10.

In Fig. 17, flannel 17, Fig. 14, is shown unfolded. On one side of the flannel various cards are removably supported by interlocked fibres, as partly shown in Figs. 8 and 14. The combination comprises a chart 37, for teaching vowel sounds. Symbols used in the chart are arranged in a definite pattern for a specific purpose.

A chart 38, similar in construction to chart 32, Fig. 16, is represented in Fig. 18. Eyelets 39 provide means for suspension. The upper section 40, is inscribed "long vowels, re-spelling" etc.; the middle section 41, "digraphs and vowels, re-spelling," etc., and the lower section 42, "digraphs, diphthongs, re-spelling," etc. The important factor, as in Fig. 16, is to align the inscriptions on the cards with corresponding symbols on chart 37. The latter may be used without chart 38. However, when used, chart 38 helps to define the pattern of chart 37 to the pupil.

When the symbols in chart 37 are read by column it will be seen that the columns are arranged in conventional order, as when vowels are taught, that is, a, e, i, o and u, respectively.

When they are read from left to right, lines 2 and 3, they emphasize the sounds of "long" vowels.

Lines 4, 5 and 6 indicate alternative or respellings of certain sounds. For example: sounds of "ai" line 4, in *train*, and "ay" line 5 in *day*, are identical with the sound of "long" ā, line 3, in *cake*, line 2. Likewise, the sound of "ea" line 9, in *bread*, is a respelling of the sound of "short" ĕ, line 8, in *bed*, line 7. The sound of "-y" line 9, in *jelly*, is a respelling of "short" ĭ, line 8, in *fish*, line 7. Subsequent lines indicate variations in sounds of vowels, digraphs and diphthongs, with their respective respellings.

It should be noted that two pieces of flannel are indicated as backgrounds of the charts, one for consonants, the other for vowels. The arrangement is not essential. It was designed for convenience in handling. Obviously, the charts can be formed on one piece of flannel if it becomes desirable.

When a pupil is ready to begin the first lesson, the teacher suspends one piece of flannel, say chart 31, Fig. 15, in a vertical or semi-vertical position, on a blackboard, easel, or other suitable support. She then tells the pupil she is going to show him a trick. The pupil is invited to examine the flannel and one or more cards. The teacher then tells him she is going to fasten the card to the flannel by "magic." She waves a card and presses its flannel back against flannel 31, where it is held in position by interlocked fibres. The pupil will be mystified and his interest will be held until the teacher tells her "secret."

The teacher selects one or more groups of cards, and mounts them on the flannel, in their respective positions, using care in arranging them so that their edges are aligned with guide lines on the flannel. The purpose of this is to impress the pupil with the desirability for neatness and precision.

Assuming that the teacher has selected cards shown in columns 1 and 2, Fig. 15, her first endeavor will be to familiarize the pupil with the correct pronunciation of names of objects shown in column 1, in which the sounds of "voiceless" or "breath" consonants occur as they appear at the beginnings of words. She tells the pupil to listen attentively when she repeats them. But while reciting the names she makes an absurd substitution, such as "elephant" for *ship*. If the pupil detects the change the teacher repeats the names and makes another substitution, such as "dog" for *fan*, etc. Practice continues until the pupil learns the names of all objects in the column. Proceeding with the lesson, the teacher tells the pupil she is going to repeat the names in whispers, so softly that he will not hear, but wants him to watch her lips and try to understand what name she speaks. She then whispers a name, such as "pig." If the pupil recognizes the word the teacher whispers another, etc., thereby focusing attention upon lip movements. The teacher then tells the pupil she will pronounce only the initial sound of each word in column 1. The sounds are identical with the sounds of the voiceless, or breath, consonants in column 2. It should be noted that the sounds of letters rather than their names will be emphasized. For example: the name of the letter "p" can be assumed to have the same pronunciation as "pea," the vegetable, whereas the sound of "p" is quite different. There is no symbol for expressing it. However, for the purpose of illustration only, in this specification, the sound of "p" can be considered as a whispered contraction of "puh."

Resuming the lesson, the teacher tells the pupil she is going to repeat the names of the objects in column 1, but will follow each name with the initial sound in each word. Beginning at the head of the column she pronounces "pig," followed by *puh*; "wheel" by *wh*; "fan" by *f*. But if, instead of pronouncing "t" after *top*, she utters a sound like the whistle of a locomotive, or the bark of a dog, and the pupil corrects her, she repeats the test with other words until all initial sounds of objects in column 1 are recognized. Similar procedure can be used for teaching vowel sounds with charts 37, Fig. 17, and 38, Fig. 18.

After a pupil has learned the correct pronunciation of the sounds of letters, symbols, etc., in charts 31 and 32, he can be taught to spell by grouping appropriate cards from both charts. The word "boyish," for instance, spelled b-oy-i-sh, can be formed by grouping cards b, line 1, column 4, Fig. 15; oy, line 20, column o, Fig. 17; i, line 8, column i, Fig. 17; sh, line 9, column 2, Fig. 15; and mounting them either on flannel 31, Fig. 15, or 17, Fig. 17.

A pupil can be taught to arrange the cards on the flannel according to their respective values in the charts. In fact, many combinations of symbols and pictorial illustrations can be arranged in accordance with the desire of the teacher. For these and other reasons, we do not limit the use of the invention to the specific method of teaching, so briefly described herein. Many variations can be used without departing from the basic principles, as herein set forth.

Some benefits to be derived from the invention are as follows:

a. Attention is assured.

b. The dullest pupil is given an opportunity to correct the teacher, thereby acquiring a sense of importance and increased self confidence.

c. By repetition of sounds, auditory patterns become fixed in the minds of pupils.

d. Pupils having articulatory defects can be aided in overcoming their handicaps.

Having described our invention, we claim:

1. In an educational device, one or more cards each bearing one or more pictures; one or more cards each bearing indicia constituting one or more symbols representing one or more sounds in the names of objects pictured on said first mentioned cards; and one or more smaller cards bearing one or more alternative symbols of sounds identical with sounds in the names of some of said pictured objects.

2. In an educational device, one or more base members; one or more cards each bearing one or more pictures; one or more cards each bearing indicia constituting one or more symbols representing a sound in the name of an object pictured on said first mentioned card; and one or more smaller cards bearing one or more alternative symbols of sounds identical with sounds in the names of some of said pictured objects; and means for removably mounting said cards on one or more of said members.

3. In an educational device, one or more pieces of flannel on one side of which are portrayed guide lines for placement of cards; one or more cards each bearing one or more pictures; one or more cards each bearing indicia constituting one or more symbols representing a sound in the name of an object pictured on one of said first mentioned cards; one or more smaller cards bearing one or more alternative symbols of sounds identical with sounds in the names of some of said pictures; and means for removably mounting said cards on said flannel.

4. In an educational device, a sheet of Canton flannel on one side of which are portrayed guide lines for placement of cards; a major group of cards comprising only cards relating to consonant sounds; a minor group of cards, included in said major group, each card bearing on one side a pictorial representation in the name of which the accent of one or more consonant sounds is emphasized; a second minor group of cards, included in said major group, each card of which bears on one side a consonant symbol, the accented sound of which is identical with the sound of a consonant symbol accented and emphasized in the name of one of said pictorial representations; a third minor group of substantially smaller cards, included in said major group, each card bearing one or more alternative symbols of sounds identical with sounds of some consonant symbols in said second minor group of cards; and means comprising flannel backing on each card for removably mounting said cards on said flannel.

5. In an educational device, a member of flexible material, on one side of which a pattern is portrayed; supporting means for said member; a plurality of cards comprising a major group; means for removably mounting said cards on said member; a minor group of cards, included in said major group, each card bearing on one side a pictorial illustration in the name of which, with two exceptions, the accent of an initial consonant sound is emphasized, said exceptions being the accents of final consonant sounds "ng" and "x" in two names; a second minor group of cards included in said major group, each card of which bears on one side a consonant symbol the accented sound of which is identical with the sound of a consonant symbol accented and emphasized in the name of one of said pictorial illustrations; a third minor group of substantially smaller cards included in said major group, each card bearing re-spelling, or alternative consonant symbols emphasizing some sound accented in said second minor group and the whole, when said cards are mounted on said member in matched relation to each other and to said pattern, forming a chart in which said consonant symbols are aligned vertically in accordance with their characteristics, such as "oral" and "nasal" sounds, subdivided respectively, into "stopped" and "open," "voiced" and "voiceless" groups; and classified horizontally according to places of formation in the mouth, said places of formation being defined as labials, labiodentals, dentals, palatal, gutturals and aspirate.

6. In an educational device, one or more members, on one side of which patterns are portrayed; supporting means therefor; a series of card groups, one group bearing pictorial illustrations on one side, in the names of which accents of certain consonant and vowel sounds are emphasized, a second group bearing symbols, the sounds of which are identical with accented sounds in the names of corresponding pictorial illustrations; a third group of substantially smaller cards each bearing re-spelling, or alternative, symbols, emphasizing some sounds in said second minor group means secured to said cards for removably mounting said cards on said members; and the whole, when said cards are mounted on said members in matched relation to each other and to said patterns, forming one or more charts in which symbols and illustrations emphasizing accented consonant sounds are aligned vertically according to their characteristics, such as "oral" and "nasal" consonant sounds, subdivided respectively into "stopped" and "open," "voiced" and "voiceless" groups; and arranged horizontally according to places of formation in the mouth, said places of formation being conventionally designated as labials, labiodentals, dentals, palatal, gutturals, and aspirate; and accented vowel symbols with corresponding pictorial illustrations aligned vertically, in columns, emphasizing the accented sounds of a, e, i, o and u, respectively, and classified horizontally in lines emphasizing sounds of long and short vowels, diphthongs and digraphs, with corresponding elements for respelling.

7. In an educational device, one or more members of flexible material, one surface of which is relatively smooth, the other having protruding fibres, said fibres forming integral parts of said material, patterns portrayed on said surface having protruding fibres, supporting means for said material; a major group of cards; a minor group of cards, included in said major group, each card bearing on one side a pictorial illustration in the name of which an accented consonant sound is emphasized; a second minor group of cards included in said major group, each card bearing on one side a character the sound of which is identical with the sound of an accented consonant emphasized in the name of one of said pictorial illustrations; a third minor group of cards included in said major group, each card bearing on one side a pictorial illustration in the name of which an accented vowel sound is emphasized; a fourth minor group of cards included in said major group, each card bearing on one side a character the sound of which is identical with the sound of an accented vowel emphasized in the name of one of said pictorial illustrations; two auxiliary groups of cards, one group of which bears symbols for use in respelling certain consonant sounds, the other, symbols for use in respelling certain vowel sounds; fibrous material secured to each card, capable of being temporarily interlocked with protruding fibres of said flexible material, thereby supporting said cards on said material when the latter is in a vertical or a semi-vertical position; and the whole, when said cards are mounted on said members in matched relation to each other and to said patterns, forming one or more charts in which symbols and illustrations emphasizing accented consonant sounds are aligned vertically according to their characteristics, such as "oral" and "nasal" sounds, subdivided repectively into "stopped," and "open," "voiced" and "voiceless" groups; and arranged horizontally with respect to places of formation in the mouth, said sounds being conventionally designated as labials, labiodentals, dentals, palatal, gutturals, and aspirate; and accented vowel symbols with corresponding pictorial illustrations aligned vertically, in columns, emphasizing the accented sounds of a, e, i, o and u, respectively, and classified horizontally in lines emphasizing sounds of long and short vowels, diphthongs, and digraphs, with alternative elements for respelling.

LICILLE D. SCHOOLFIELD.
JOSEPHINE B. TIMBERLAKE.